US012586027B2

(12) United States Patent
Majdabadi et al.

(10) Patent No.: US 12,586,027 B2
(45) Date of Patent: Mar. 24, 2026

(54) INTERNET OF THINGS (IoT) EVENT-REACTIVE ROBOTIC DELIVERY RESCHEDULING

(71) Applicant: INTERNATIONAL BUSINESS MACHINES CORPORATION, Armonk, NY (US)

(72) Inventors: Hamid Majdabadi, Ottawa (CA); Jeremy R. Fox, Georgetown, TX (US); Jessica Nahulan, Markham (CA); Mauro Marzorati, Lutz, FL (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 18/452,136

(22) Filed: Aug. 18, 2023

(65) Prior Publication Data

US 2025/0061408 A1     Feb. 20, 2025

(51) Int. Cl.
G06Q 10/0833 (2023.01)
G01C 21/34 (2006.01)
G06Q 10/0832 (2023.01)

(52) U.S. Cl.
CPC ..... G06Q 10/0833 (2013.01); G01C 21/3415 (2013.01); G06Q 10/0832 (2013.01)

(58) Field of Classification Search
CPC ........... G06Q 10/0833; G06Q 10/0832; G01C 21/3415
See application file for complete search history.

(56) References Cited

U.S. PATENT DOCUMENTS 10,643,171 B1 * 5/2020 Zhang .............. G06Q 10/08355
11,599,846 B2 3/2023 Neumann
(Continued)

FOREIGN PATENT DOCUMENTS

CN     114358693 B     1/2023
CN     115719193 A     2/2023
(Continued)

OTHER PUBLICATIONS

Ahmadzadegan, M. Hossein, et al. "Intelligent monitoring systems for transportation of perishable products based internet of things (iot) technology." 2020 IEEE 9th International Conference on Communication Systems and Network Technologies (CSNT). IEEE, 2020. (Year: 2020).*
(Continued)

*Primary Examiner* — Jeff Zimmerman
*Assistant Examiner* — Wayne S. Murray
(74) *Attorney, Agent, or Firm* — Jordan T. Schiller

(57) ABSTRACT

A method for triggering an event reactive delivery schedule adjustment. The method detects one or more events leading to a delay in a delivery schedule based on integrating IoT sensor data and real-time events. The method further triggers a reschedule event based on the detected one or more events leading to the delay in the delivery schedule. The method further determines availability and location of a user to receive a delivery, based on the reschedule event, and reschedules or cancels the delivery based on the determined availability and location of the user. The method notifies the user about any changes to the delivery, based on user preferences.

18 Claims, 3 Drawing Sheets

(56) References Cited

U.S. PATENT DOCUMENTS

| | | | | |
|---|---|---|---|---|
| 2014/0277900 | A1* | 9/2014 | Abhyanker | .......... G05D 1/0274 |
| | | | | 701/25 |
| 2018/0349844 | A1 | 12/2018 | Bounasser | |
| 2018/0357604 | A1* | 12/2018 | Li | .................... G06Q 10/06316 |
| 2020/0177671 | A1* | 6/2020 | Tofighbakhsh | ......... H04L 67/12 |
| 2020/0311676 | A1* | 10/2020 | Smith, Jr. | ........... G06Q 20/407 |
| 2020/0364663 | A1 | 11/2020 | Colella | |
| 2021/0192373 | A1 | 6/2021 | Luckay | |
| 2022/0110189 | A1* | 4/2022 | Volkerink | .......... G06Q 10/0832 |

FOREIGN PATENT DOCUMENTS

| | | | |
|---|---|---|---|
| JP | 2023038353 | A | 3/2023 |
| WO | 2017210292 | A1 | 12/2017 |

OTHER PUBLICATIONS

6Sense, "IBM Sterling Order Management", Technographics / Inventory And Order Management, Accessed on May 17, 2023, 7 pages, https://6sense.com/tech/inventory-and-order-management/ibm-sterling-order-management-market-share.

Ankit et al., "Multichannel Order Management Market", Allied Market Research, Dec. 2022, 7 pages.

IBM, "Build smarter supply chains with AI and blockchain", Accessed on May 17, 2023, 6 pages, https://www.ibm.com/supply-chain.

Omar, "How to Change the Delivery Date on Amazon (Step by Step)", Digital Solutions, Updated on Jul. 24, 2022, 23 pages, https://ojdigitalsolutions.com/how-to-change-delivery-date-on-amazon/.

* cited by examiner

100

CLIENT COMPUTER 101

PROCESSOR SET 110

| PROCESSING CIRCUITRY 120 | CACHE 121 |
|---|---|

COMMUNICATION FABRIC 111

VOLATILE MEMORY 112

PERSISTENT STORAGE 113

OPERATING SYSTEM 122

ROBOTIC DELIVERY RESCHEDULING PROGRAM CODE 150

PERIPHERAL DEVICE SET 114

| UI DEVICE SET 123 | STORAGE 124 | IoT SENSOR SET 125 |
|---|---|---|

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOT PHYSICAL MACHINE SET 142 |
|---|---|
| VIRTUAL MACHINE SET 143 | CONTAINER SET 144 |

HOST SERVER
210

ROBOTIC DELIVERY
RESCHEDULING
PROGRAM
220

Detecting Module
222

Triggering Module
224

Determining Module
226

Rescheduling Module
228

Notifying Module
229

USER COMPUTING
DEVICE
230

User Interface
232

Calendar
234

Global Positioning
System (GPS)
236

NETWORK
202

Internet of
Things (IoT)
Sensors
240

DATABASE SERVER
250

Sensors Database
252

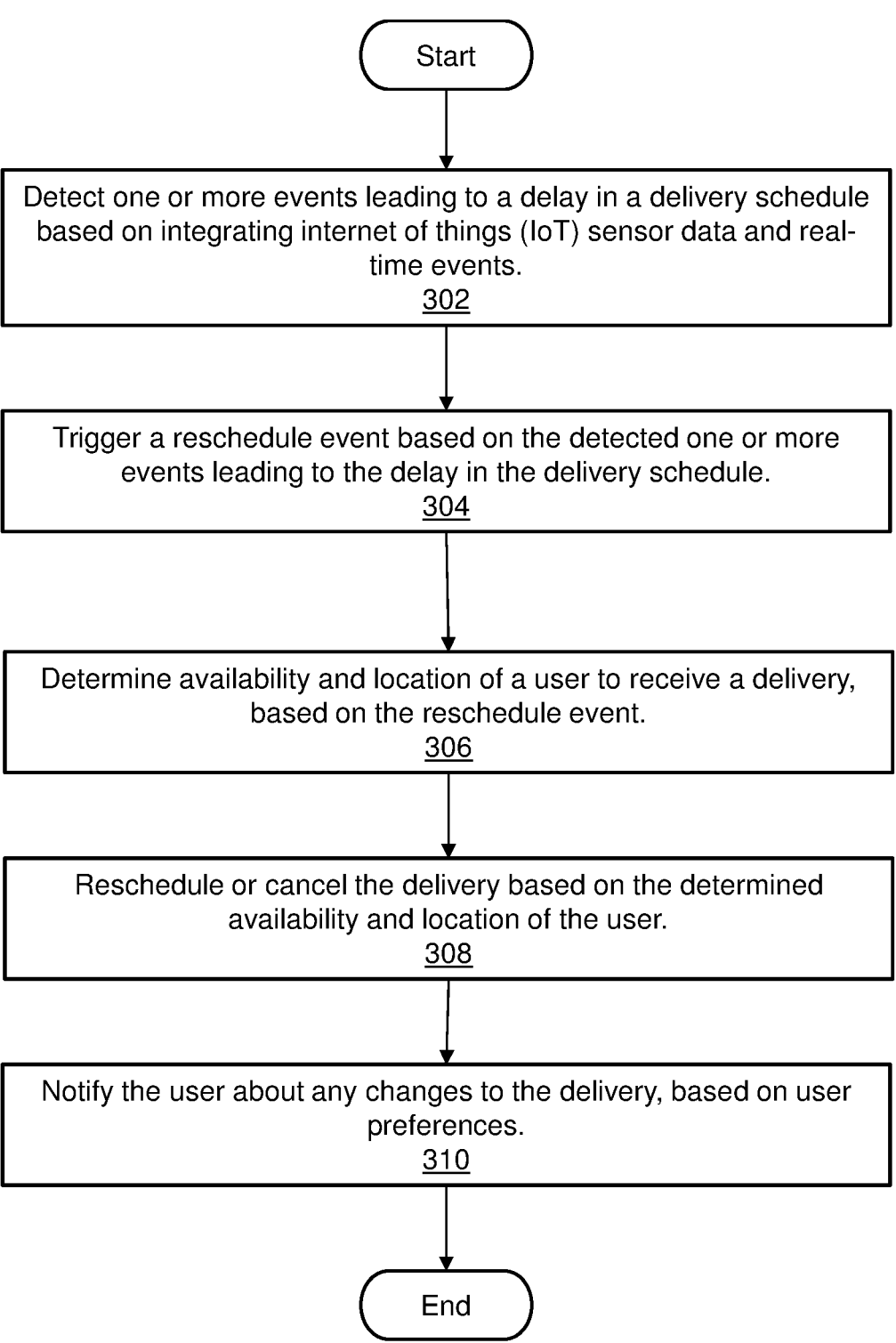

Start

Detect one or more events leading to a delay in a delivery schedule based on integrating internet of things (IoT) sensor data and real-time events.
302

Trigger a reschedule event based on the detected one or more events leading to the delay in the delivery schedule.
304

Determine availability and location of a user to receive a delivery, based on the reschedule event.
306

Reschedule or cancel the delivery based on the determined availability and location of the user.
308

Notify the user about any changes to the delivery, based on user preferences.
310

End

*FIG. 3*

INTERNET OF THINGS (IoT) EVENT-REACTIVE ROBOTIC DELIVERY RESCHEDULING

BACKGROUND

The present disclosure relates generally to the field of cognitive computing, Internet of Things (IoT), and more particularly to data processing and dynamic rescheduling of deliveries based on external events.

In industries such as logistics, transportation, and supply-chain management, IoT technologies are becoming increasingly important. IoT is a powerful resource that already aids industries in their delivery processes. For example, IoT is being used to automatically re-order low in-stock products and to track delivery vehicles. In this fashion, IoT devices enable more accurate delivery time predictions to accommodate real-time traffic. In turn, more accurate delivery time predictions allow for more efficient delivery fleet management and better use of time by vendors awaiting incoming shipments and schedule planning.

In many instances, the delivery industry faces unexpected and unplanned-for rescheduling of deliveries which can cost the companies expecting these goods a significant amount of lost revenue.

Delivery rescheduling is also a problem that troubles household users expecting delivery parcels but who do not receive their parcels due to unforeseen circumstances such as bad weather events, road closures, local events, construction, or other obstacles that inhibit delivery vehicles from reaching their destination or delaying their arrival.

Currently, most companies only provide manual solutions to customers when rescheduling is required.

BRIEF SUMMARY

Embodiments of the present invention disclose a method, a computer program product, and a system.

According to an embodiment, a method, in a data processing system including a processor and a memory, for triggering an event reactive delivery schedule adjustment. The method detects one or more events leading to a delay in a delivery schedule based on integrating IoT sensor data and real-time events. The method further triggers a reschedule event based on the detected one or more events leading to the delay in the delivery schedule. The method further determines availability and location of a user to receive a delivery, based on the reschedule event, and reschedules or cancels the delivery based on the determined availability and location of the user. The method notifies the user about any changes to the delivery, based on user preferences.

A computer program product, according to an embodiment of the invention, includes a non-transitory tangible storage device having program code embodied therewith. The program code is executable by a processor of a computer to perform a method. The method detects one or more events leading to a delay in a delivery schedule based on integrating IoT sensor data and real-time events. The method further triggers a reschedule event based on the detected one or more events leading to the delay in the delivery schedule. The method further determines availability and location of a user to receive a delivery, based on the reschedule event, and reschedules or cancels the delivery based on the determined availability and location of the user. The method notifies the user about any changes to the delivery, based on user preferences.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method detects one or more events leading to a delay in a delivery schedule based on integrating IoT sensor data and real-time events. The method further triggers a reschedule event based on the detected one or more events leading to the delay in the delivery schedule. The method further determines availability and location of a user to receive a delivery, based on the reschedule event, and reschedules or cancels the delivery based on the determined availability and location of the user. The method notifies the user about any changes to the delivery, based on user preferences.

BRIEF DESCRIPTION OF THE DRAWINGS

FIG. 1 depicts a diagram graphically illustrating the hardware components of a computing environment 100, such as robotic delivery rescheduling computing environment 200, and a cloud computing environment, in accordance with an embodiment of the present invention.

FIG. 3 is a flowchart illustrating the operation of robotic delivery rescheduling program 220 of FIG. 2, in accordance with an embodiment of the present invention.

DETAILED DESCRIPTION

Figure 2:
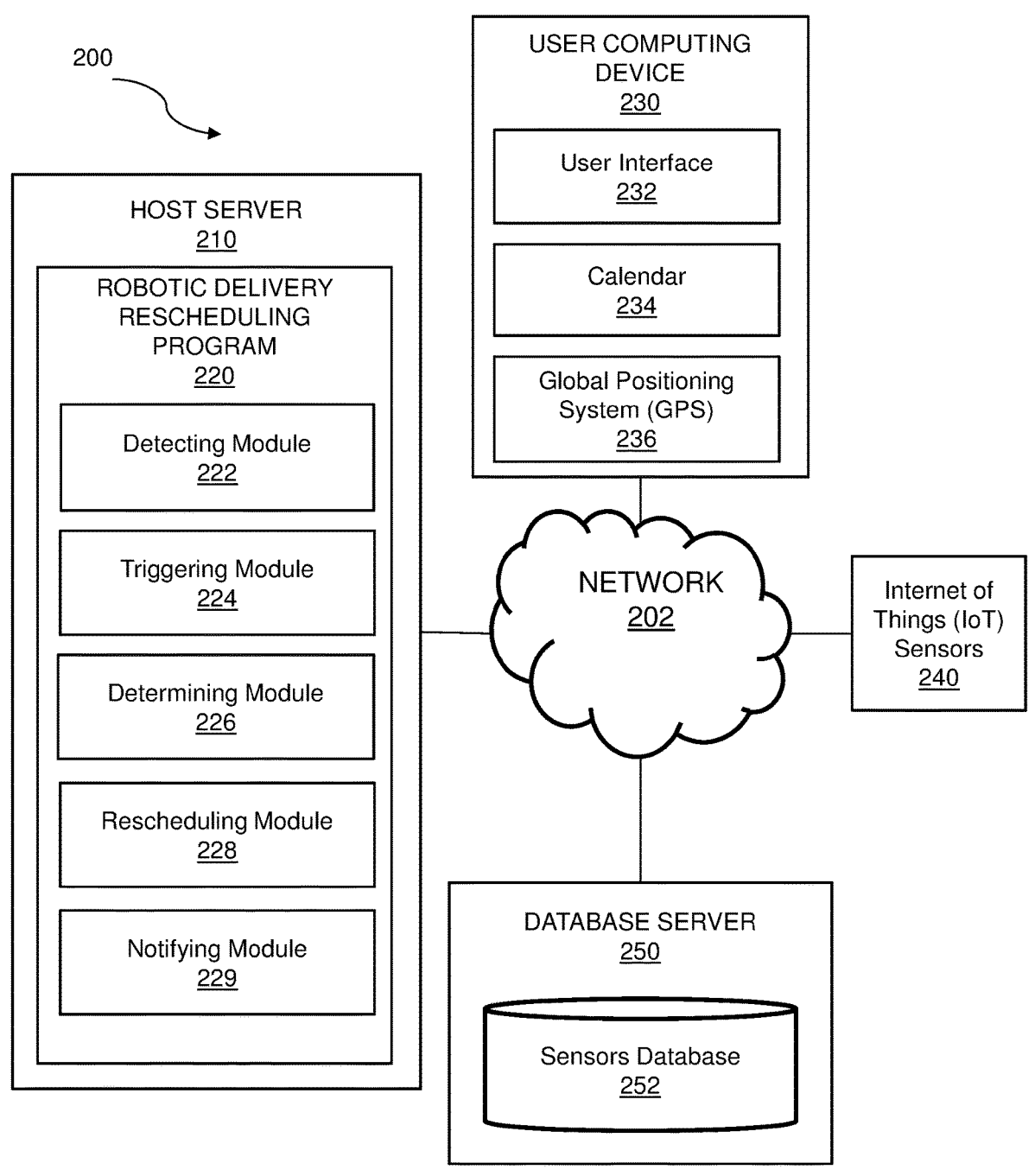
FIG. 2 illustrates robotic delivery rescheduling computing environment 200, in accordance with an embodiment of the present invention.

In today's technology-driven business world, IoT devices may be leveraged to solve a common problem faced by the delivery industry, which is unexpected and unplanned-for delivery reschedules which can cost these companies significant losses.

Delivery rescheduling may also create a negative customer experience. Local household users who, expecting their delivery parcels, may not receive their packages due to a variety of reasons such as bad weather events, road closures, local events, construction, or other dynamic obstacles that take place and inhibit delivery vehicles from reaching their destination or delay them in their routes which can lead to certain other packages not being able to be delivered as scheduled.

Another factor that affects timely package delivery may be a customer's own personal schedule which dynamically changes in availability from the pre-authorized and agreed upon delivery date/time. In turn, this leads to a failed delivery attempt where the user is not available to receive the package.

Currently, most companies only provide manual solutions to customers for rescheduling a delivery. The user would have to manually assert that a reschedule is needed and provide a reason. Then the user would have to log onto the product delivery organization's website and manually select to reschedule with a new date/time.

The present invention discloses a solution that utilizes IoT to provide a reactive delivery rescheduling solution which will automate the process when the invention module (i.e., robotic delivery rescheduling program 220) detects events leading to delay/unavailability issues and automates the delivery rescheduling process based on the identified rescheduling requirement.

For example, robotic delivery scheduling program 220 integrates with weather data, real-time local/neighborhood events and customers' schedules/engagement with IoT devices to detect and identify risks in delivery schedules, powered by robotic linked automation.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 depicts a diagram graphically illustrating the hardware components of a computing environment 100, such as robotic delivery rescheduling computing environment 200, and a cloud computing environment in accordance with an embodiment of the present invention.

Computing environment 100 contains an example of an environment for the execution of at least some of the computer code involved in performing the inventive methods, such as robotic delivery rescheduling program code 150. In addition to the robotic delivery rescheduling program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and robotic delivery rescheduling program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in robotic delivery rescheduling program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in robotic delivery rescheduling program code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates robotic delivery rescheduling computing environment 200, in accordance with an embodiment of the present invention. Robotic delivery rescheduling computing environment 200 includes host server 210, user computing device 230, Internet of Things (IoT) sensors 240, and database server 250, all connected via network 202. The setup in FIG. 2 represents an example embodiment configuration for the present invention and is not limited to the depicted setup to derive benefit from the present invention.

In an exemplary embodiment, host server 210 includes robotic delivery rescheduling program 220. In various embodiments, host server 210 may be a laptop computer, tablet computer, netbook computer, personal computer (PC), a desktop computer, a personal digital assistant (PDA), a smart phone, or any programmable electronic device capable of communicating with user computing device 230, IoT sensors 240, and database server 250, via network 202. Host server 210 may include internal and external hardware components, as depicted, and described in further detail with reference to FIG. 1. In other embodiments, host server 210 may be implemented in a cloud computing environment, as further described in relation to FIG. 1. Host server 210 may also have wireless connectivity capabilities allowing it to communicate with user computing device 230, IoT sensors 240, database server 250, and other computers or servers over network 202.

With continued reference to FIG. 2, user computing device 230 includes user interface 232, calendar 234, and global positioning system (GPS) 236. In various embodiments, user computing device 230 may be a laptop computer, tablet computer, netbook computer, personal computer (PC), a desktop computer, a personal digital assistant (PDA), a smart phone, a server, a wearable device, or any programmable electronic device capable of communicating with host server 210, IoT sensors 240, and database server 250, via network 202. User computing device 230 may include internal and external hardware components, as depicted, and described in further detail with reference to FIG. 1. In other embodiments, user computing device 230 may be implemented in a cloud computing environment, as described in relation to FIG. 1. User computing device 230 may also have wireless connectivity capabilities allowing it to communicate with host server 210, IoT sensors 240, database server 250, and other computers or servers over network 202.

In exemplary embodiments, user computing device 230 includes user interface 232, which may be a computer program that allows a user to interact with user computing device 230 and other connected devices via network 202. For example, user interface 232 may be a graphical user interface (GUI). In addition to comprising a computer program, user interface 232 may be connectively coupled to hardware components, such as those depicted in FIG. 1, for sending and receiving data. In an exemplary embodiment, user interface 232 may be a web browser, however in other embodiments user interface 232 may be a different program capable of receiving user interaction and communicating with other devices, such as host server 210.

In exemplary embodiments, user interface 232 may be a touch screen display, a visual display, a remote operated display, or a display that receives input from a physical keyboard or touchpad. In alternative embodiments, user interface 232 may be operated via voice commands or by any other means known to one of ordinary skill in the art.

In exemplary embodiments, user computing device 230 includes calendar 234, which may be a software program capable of being run on a user mobile device, such as user computing device 230.

In exemplary embodiments, calendar 234 may be a computer program, on user computing device 230, that allows a user to electronically enter data for a meeting, appointment, or event for a specific date, time, and place. Calendar 234 may include a user's upcoming appointments, meetings, vacation schedule, events, and so forth, including times, locations, and venues.

In various exemplary embodiments, calendar 234 may be updated by the user based on changed circumstances and events. In other embodiments, calendar 234 may be dynamically updated based on a change in an event, a venue, a time, and/or a location.

In exemplary embodiments, calendar 234 may be linked to social media platforms, status messaging tools, and may further be capable of communicating with robotic delivery rescheduling program 220, IoT sensors 240, and database server 250, via network 102.

In exemplary embodiments, GPS 236 is a computer program on user computing device 230 that provides time and location information for user computing device 230. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers can determine the location where the signals were received. In exemplary embodiments, GPS 236 can provide real-time location detection of a user computing device 230.

In exemplary embodiments, GPS 236 can provide a location proximity of a user computing device 230 with IoT sensors 240 within a public domain.

In exemplary embodiments, IoT sensors 240 can include a device, hardware component, module, or subsystem capable of recording, capturing, and detecting events (e.g., environmental, weather events, traffic, road closures, accidents, local events, and so forth) or changes in a user environment, or proximity, and sending the detected data to other electronics (e.g., host server 110), components (e.g., sensors database 252), or programs (e.g., robotic delivery rescheduling program 220) within a system such as robotic delivery rescheduling computing environment 200. In various embodiments, the detected data collected by IoT sensors 240 is instrumental in creating a knowledge corpus for delivery rescheduling.

IoT sensors 240, in exemplary embodiments, may be a global positioning system (GPS), software application, proximity sensor, camera, microphone, light sensor, infrared sensor, weight sensor, temperature sensor, tactile sensor, motion detector, optical character recognition (OCR) sensor, occupancy sensor, heat sensor, analog sensor (e.g., potentiometers, force-sensing resistors), radar, radio frequency sensor, quick response (QR) code, video camera, digital camera, Internet of Things (IoT) sensors, lasers, gyroscopes, accelerometers, actuators, structured light systems, road condition sensors, traffic sensors, weather sensors, and any other device(s) used for estimating, detecting, and identifying unforeseen events like road conditions and weather.

In exemplary embodiments, IoT sensors 240 are capable of continuously monitoring, collecting, and saving collected data on a local storage, such as sensors database 252, or sending the collected data to robotic delivery rescheduling program 220. In alternative embodiments, IoT sensors 240 may be capable of detecting, communicating, pairing, or syncing with internet of things (IoT) devices, thus creating opportunities for more direct integration of the physical world into computer-based systems, and resulting in improved efficiency, accuracy, and economic benefit in addition to reduced human intervention.

In exemplary embodiments, database server 250 includes sensors database 252. In various embodiments, database server 250 may be a laptop computer, tablet computer, netbook computer, personal computer (PC), a desktop computer, a personal digital assistant (PDA), a smart phone, a server, or any programmable electronic device capable of communicating with host server 210, user computing device 230, and IoT sensors 240, via network 202. Database server 250 may include internal and external hardware components, as depicted and described in further detail with reference to FIG. 1. In other embodiments, database server 250 may be implemented in a cloud computing environment, as described in relation to FIG. 1. Database server 250 may also have wireless connectivity capabilities allowing it to communicate with host server 210, user computing device 230, IoT sensors 240, and other computers or servers over network 202.

In exemplary embodiments, sensors database 252 may contain one or more sets of learning data. Learning data may include data sets comprising gathered data from IoT sensors 240, such as weather and road conditions data in specific geographic locations at different times of the year, a user's schedule and daily routine (e.g., school, work, vacation, appointments, etc.), and user preferences associated with delivery items.

While sensors database 252 is depicted as being stored on database server 250, in other embodiments, sensors database 252 may be stored on user computing device 230, host server 210, robotic delivery rescheduling program 220, or any other device or database connected via network 202, as a separate database. In alternative embodiments, sensors database 252 may be comprised of a cluster or plurality of computing devices, working together, or working separately.

With continued reference to FIG. 2, host server 210 includes robotic delivery rescheduling program 220. Host server 210 may be a laptop computer, tablet computer, netbook computer, personal computer (PC), a desktop computer, a personal digital assistant (PDA), a smart phone, or any programmable electronic device capable of communicating with user computing device 230, IoT sensors 240, and database server 250, via network 202.

With continued reference to FIG. 2, robotic delivery rescheduling program 220, in an exemplary embodiment, may be a computer application on host server 210 that contains instruction sets, executable by a processor. The instruction sets may be described using a set of functional modules. In exemplary embodiments, robotic delivery rescheduling program 220 may receive input from user computing device 230, IoT sensors 240, and database server 250, over network 202. In alternative embodiments, robotic delivery rescheduling program 220 may be a computer application on user computing device 230, or a standalone program on a separate electronic device.

With continued reference to FIG. 1, the functional modules of robotic delivery rescheduling program 220 include detecting module 222, triggering module 224, determining module 226, rescheduling module 228, and notifying module 229.

In exemplary embodiments, robotic delivery rescheduling program 220 is an IoT-centric event-reactive robotic automation linked to user preferences, schedule, and location coupled with delivery impacting events, both predicted and unpredicted, aggregated in real-time leading to auto notification of delivery reschedule to the source indicating a new time and place for delivery.

FIG. 3 is a flowchart illustrating the operation of robotic delivery rescheduling program 220 of FIG. 2, in accordance with embodiments of the present disclosure.

With reference to FIGS. 2 and 3, detecting module 222 includes a set of programming instructions, in robotic delivery rescheduling program 220, to detect one or more events leading to a delay in a delivery schedule based on integrating IoT sensor data and real-time events (step 302). The set of programming instructions is executable by a processor.

In exemplary embodiments, robotic delivery rescheduling program 220 includes an opt-in feature, enabling a user to set preferences (e.g., give or revoke permissions) for detecting, monitoring, and identifying a user's location, schedule, and other personal IoT sensor outputs (e.g., calendar 234, GPS 236, etc.) configured to interact with detecting module 222.

In exemplary embodiments, by opting-in, user settings may be set to engage with detecting module 222 and the automation process, thus authorizing the robotic delivery rescheduling program 220 to act with no approval notifications. For example, robotic delivery rescheduling program 220 may act if conditions related to user status are correlated to sensitive deliveries such as medical supplies and equipment, food, and perishables, etc.

In exemplary embodiments, detecting module 222 can detect existing IoT sensors 240 (e.g., traffic sensors, weather sensors, or road condition sensors) that are installed along a delivery route. Once the existing IoT sensors 240 have been identified, detecting module 222 can collect data from these IoT sensors 240 in real-time. Data may include information on traffic congestion, weather conditions, road conditions, and other external factors enabled with IT to transmit a conditional state.

In further exemplary embodiments, detecting module 222 can compare collected IoT sensor data with an expected original delivery schedule to identify events that may impact upcoming deliveries. Robotic delivery rescheduling program 220 can then analyze the IoT sensor data to determine which deliveries are affected by an event (e.g., weather, road closures, etc.) by cross-referencing the original delivery schedule with the location and timing of an unexpected event (e.g., weather, road closures, etc.). Detecting module 222, thus, identifies new delivery expectations considering the identified unexpected events.

In exemplary embodiments, robotic delivery rescheduling program 220 integrates user IoT data with external data sources. The data collected by user IoT devices and a user's schedule and location (i.e., calendar 234, GPS 236, etc.) is gathered to discover which updated deliveries are no longer feasible. Detecting module 222 can identify if the scheduled delivery has contents (e.g., perishables, medicine, etc.) that match the user's preferences for adjusting the scheduled delivery. When applicable, detecting module 222 checks the user's projected location at the time of the updated delivery. If the user will be at an alternate location, then robotic delivery rescheduling program 220 marks the delivery to be adjusted.

In alternative embodiments, detecting module 222 can autonomously add or subtract IoT sensors 240, based on temporal conditions, to detect and identify a risk in the delivery schedule, powered by robotic-linked automation for various neighborhood conditions.

With continued reference to FIGS. 2 and 3, triggering module 224 includes a set of programming instructions in robotic delivery rescheduling program 220, to trigger a reschedule event based on the detected one or more events leading to the delay in the delivery schedule (step 304). The set of programming instructions is executable by a processor.

In exemplary embodiments, triggering module 224 triggers a reschedule event based on the forecasted fitness of the receiver to employ, care, and maintain the durable delivered items. A user may have set up user preferences in robotic delivery rescheduling program 220 to handle various scenarios concerning the delivery of various types of items (e.g., perishables, medicines, goods that require refrigeration/freezer, etc.).

In alternative embodiments, triggering module 224 may include an authorized robotic agent that acts on behalf of the user based on the IoT sensor data correlated with user preferences. For example, if the user is not home during the delivery of food items that require refrigeration, then triggering module 224 automatically interacts with the shipper to reschedule the delivery when the user is at home.

In alternative embodiments, the user may update IoT and event-based settings and preferences to trigger a reschedule event when the type of delivery includes specific items consisting of at least one of the following: medical supplies, perishable food, and items sensitive to outside temperatures.

In further exemplary embodiments, a user may update event-based settings and preferences to include a threshold arrival time for the user to get home based on external events like weather, traffic, road construction, etc.

In other embodiments, a user may update their user preferences to cancel their delivery if a reschedule fee exceeds a user preferred threshold.

In exemplary embodiments, triggering module 224 acts to ensure the user preferences, including fees, are in accordance with the user settings and take real-time action.

In exemplary embodiments, a user authorizes their mobile device, or user computing device 230, to integrate with robotic delivery rescheduling program 220.

In further exemplary embodiments, user computing device 230 is authorized to share calendar 234 and GPS 236 location information with robotic delivery rescheduling program 220. A user may opt-out of information sharing with robotic delivery rescheduling program 220 at any time, at user's discretion.

With continued reference to FIGS. 2 and 3, determining module 226 includes a set of programming instructions in robotic delivery rescheduling program 220, to determine availability and location of a user to receive a delivery, based on the reschedule event (step 306). The set of programming instructions is executable by a processor.

In exemplary embodiments, the location of the user is taken into consideration by determining module 226 to determine a rescheduling location. Current user location, location indicated via scheduled events on the user's calendar 234, and predicted location based on user travel patterns and routes taken for day-to-day events (e.g., travel between work and home), are all used to determine and recommend the new time and place for the delivery reschedule event.

In further exemplary embodiments, determining module 226 can find a drop-off point on the user's predicted route which would be convenient to both the user and accessible to the delivery truck driver avoiding road closures that may substantially delay the driver or prevent them from making the delivery altogether.

With continued reference to FIGS. 2 and 3, rescheduling module 228 includes a set of programming instructions in robotic delivery rescheduling program 220, to reschedule or cancel the delivery based on the determined availability and location of the user (step 308). The set of programming instructions is executable by a processor.

In exemplary embodiments, user IoT sensor data and real-time events are integrated into the delivery schedule for each type of delivery category. Rescheduling module 228 may re-route the user to arrive home for a time-sensitive delivery, based on the user's schedule, projected location, and expected traffic correlated with a delivery time.

In exemplary embodiments, user preferences in robotic delivery rescheduling program 220 may further include re-routing a delivery to an alternate location and time slot on the delivery route, rescheduling the delivery for a future date, and canceling the delivery altogether if rescheduling fees exceed a threshold amount.

In exemplary embodiments, rescheduling module 228 auto-adjusts the delivery schedule. A robotic agent, on behalf of and authorized by the user, identifies alternate options matching delivery capabilities with user availability and location.

In further exemplary embodiments, rescheduling module 228 may include re-routing the current delivery to an alternate location and time slot on the route, rescheduling deliveries for a later date, or canceling deliveries altogether. Considerations, which may be based on user preferences, include perishability (which prohibits significant delay), product size (which may make an alternate location impractical), order priority (i.e., customer paid extra for fast delivery implying importance to timely delivery), and fees for any alteration.

In alternative embodiments, the commerce platform or establishment that supports robotic delivery rescheduling program 220 will accept the reschedule request and recommendation notification if they are part of the elite membership group to authorize robotic interaction within the platform portal.

In further alternative embodiments, delivery and transport industry services would be integrated into robotic delivery rescheduling program 220 and be able to get recommendations for driver delivery routes which take into consideration the rescheduled deliveries (e.g., their new times and locations). The delivery and transport services would benefit from driver route recommendations which would allow delivery drivers to reach more customers at times when the customers are available to receive the deliveries, leading to more successfully completed deliveries, and saved time due to route recommendations taking weather conditions, events, and road closures into consideration.

In alternative embodiments, rescheduling module 228 can optionally prompt users to reschedule their delivery time/location if the system finds a convenient location that suits multiple customers as a drop-off/pick-up point which may speed up deliveries or allow the delivery driver to successfully complete the drop-off if there are external events blocking the driver from reaching certain locations or delaying their route. Ultimately, this would benefit the user since the alternative may mean the delivery is postponed until the next day due to extenuating circumstances.

With continued reference to FIGS. 2 and 3, notifying module 229 includes a set of programming instructions in robotic delivery rescheduling program 220, to notify the user about any changes to the delivery, based on user preferences (step 310). The set of programming instructions is executable by a processor.

In exemplary embodiments, notifying module 229 can notify customers about any changes to their delivery via automated push notifications or other means of notification known to one of ordinary skill in the art. The user may select the form of notification in their user settings and preferences.

In alternative embodiments, notifying module 229 notifies the user to confirm the rescheduling or cancellation action for the delivery.

In alternative embodiments, the commerce or provider platform would need to update any internal systems with any updated delivery statuses. This may include updating the delivery tracking system or inventory management system.

In exemplary embodiments, robotic delivery rescheduling program 220 may adjust a delivery based on one or more of the following scenarios: (1) the provider prompts the rescheduling of the expected delivery; (2) the customer prompts the rescheduling of the expected delivery; (3) the delivery is automatically rescheduled based on user preferences; and (4) the delivery of durable goods is automatically rescheduled based on customer risk reduction.

The following illustrative examples depict each of the rescheduling scenarios mentioned above.

With reference to an illustrative example wherein the provider prompts the rescheduling of the expected delivery: Joe is expecting a delivery tomorrow. There is a forecast for freezing rain during the expected time of the delivery. Joe receives a notification from the delivery system, on his mobile device, that the delivery is rescheduled due to severe weather conditions. Joe is traveling for a day and the proposed new delivery date/time is not workable based on his schedule. Joe opts-in to robotic delivery rescheduling program 220 and as soon as he receives a reschedule notification, detecting module 222 is triggered to take action and interact with other IoT sensors 240 in Joe's mobile device (i.e., user computing device 230). Determining module 226 determines an optimal new delivery date/time. Triggering module 224 checks the new delivery schedule with Joe's synced calendar 234 and verifies live and predicted event data based on the target delivery time. Rescheduling module 228 is authorized, via robotic automation, to access Joe's online account and modify the delivery time. Once the new delivery date/time are set, notifying module 229 automatically notifies Joe of the new date/time via a confirmation push notification to his mobile device.

With reference to an illustrative example wherein the customer prompts the rescheduling of the expected delivery: Joe is expecting a delivery but there is a summer carnival in his neighborhood which closed all the local streets, and there are changes to Joe's schedule where he won't be home for the expected delivery. Joe wants to reschedule the delivery. Joe opts-in to robotic delivery rescheduling program 220 and a delivery reschedule is auto-initiated based on the detected road closures and Joe's changes to his schedule. Detecting module 222 evaluates Joe's new schedule based on his calendar 234, verifies local event data and road closures affecting the anticipated delivery route, and then notifies him of the new proposed delivery location and time, for him to accept.

With reference to an illustrative example wherein the delivery is automatically rescheduled based on user preferences: Joe was expecting his groceries to be delivered in the morning before he left for work but due to road closures from a community event taking place, the delivery truck is delayed. Joe unfortunately has to leave for work but has signed into robotic delivery rescheduling program 220 and feels secure knowing that the program will take care of the rescheduling and delivery timing of his groceries. Detecting module 222 checks Joe's schedule (e.g., calendar 234) and expected delivery time, and detects current events data, road closures, and its effect on the target delivery time. Triggering module 224 identifies a potential delivery failure and checks user preferences. In user preferences, Joe has indicated that perishable food items are not to be left outside in cold temperatures, such as currently detected. The delivery truck driver is re-routed for the next delivery to other customers. Determining module 226 finds a possible drop-off point where the delivery truck driver can meet Joe on the delivery route, wherein the drop-off point coincides with Joe's schedule and is on his normal route that he takes between work and home later in the day. Rescheduling module 228 proposes the new pick-up time and location and notifying module 229 notifies Joe via a push notification to his mobile device (e.g., user computing device 230), which he approves.

With reference to an illustrative example wherein the delivery of durable goods is automatically rescheduled based on customer risk reduction: Joe is expecting delivery of a durable good (e.g., refrigerator, patio furniture, etc.) at a time where likely weather conditions threaten the survivability of the newly delivered item. Joe would like to defer the delivery of the durable good, and consequent transfer of risk, to a later time such that the care of the durable good remains with the shipper. Robotic delivery rescheduling program 220 can interact with the shipper and negotiate a transaction where Joe would pay the shipper to retain the durable good for a short period of time until the weather clears and it's safe to deliver the item. In another embodiment, robotic delivery rescheduling program 220 would trigger a reschedule in accordance with the previous illustrative example, wherein the delivery is automatically rescheduled based on Joe's user preferences. In this case, Joe's preferences include not leaving any durable goods outside in the elements. The delivery is thus auto-rescheduled to a later time when the weather conditions are permitting.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, user computing device 230, IoT sensors 240, and database server 250.

The invention claimed is:

1. A computer-implemented method for triggering an event reactive delivery schedule adjustment, comprising:

detecting one or more events leading to a delay in a delivery schedule based on integrating internet of things (IoT) sensor data and real-time events, wherein one or more IoT sensors are located along a delivery route;

triggering, automatically, a reschedule event based on the detected one or more events leading to the delay in the delivery schedule;

determining availability and location of a user to receive a delivery, based on the reschedule event and a calendar of the user, and wherein a projected location of the user to receive the delivery is determined via a global positioning system (GPS);

autonomously increasing collection of additional IoT sensor data, based on temporal conditions, to detect and identify a risk in the delivery schedule powered by robotic-linked automation for various neighborhood conditions, wherein the increased IoT sensor data comprises weather events, traffic events, or road closures leading to a delayed delivery;

rescheduling or canceling the delivery based on the determined availability and location of the user, wherein the delivery is auto-adjusted by a robotic agent, on behalf of and authorized by the user, to identify alternate options matching delivery capabilities with user availability and location;

notifying the user about any changes to the delivery, based on user preferences and providing one or more recommendations for driver delivery routes that take into consideration new times and locations for rescheduled deliveries, thus providing a seamless and automated solution for delivery rescheduling, reducing manual intervention, and improving overall efficiency.

2. The computer-implemented method of claim 1, further comprising:

updating IoT and event-based settings and preferences, by the user, to trigger a reschedule event when a type of delivery includes specific items from a group consisting of medical supplies, perishable food, and items sensitive to outside temperatures.

3. The computer-implemented method of claim 1, wherein user IoT sensor data and real-time events are integrated into the delivery schedule for each type of delivery category, further comprising:

re-routing the user to arrive home for a time-sensitive delivery, based on a user's schedule, projected location, and expected traffic correlated with a delivery time.

4. The computer-implemented method of claim 1, wherein an authorized robotic agent acts on behalf of the user based on the IoT sensor data correlated with user preferences.

5. The computer-implemented method of claim 4, wherein the user preferences comprise:

re-routing a delivery to an alternate location and time slot on a delivery route;

rescheduling the delivery for a future date, and canceling the delivery if rescheduling fees exceed a threshold amount.

6. The computer-implemented method of claim 4, wherein the authorized robotic agent notifies the user to confirm a rescheduling or cancellation action for the delivery.

7. A computer program product, comprising a non-transitory tangible storage device having program code embodied therewith, the program code executable by a processor of a computer to perform a method, the method comprising:

detecting one or more events leading to a delay in a delivery schedule based on integrating internet of things (IoT) sensor data and real-time events, wherein one or more IoT sensors are located along a delivery route;

triggering, automatically, a reschedule event based on the detected one or more events leading to the delay in the delivery schedule;

determining availability and location of a user to receive a delivery, based on the reschedule event and a calendar of the user, and wherein a projected location of the user to receive the delivery is determined via a global positioning system (GPS);

autonomously increasing collection of additional IoT sensor data, based on temporal conditions, to detect and identify a risk in the delivery schedule powered by robotic-linked automation for various neighborhood conditions, wherein the increased IoT sensor data comprises weather events, traffic events, or road closures leading to a delayed delivery;

rescheduling or canceling the delivery based on the determined availability and location of the user, wherein the delivery is auto-adjusted by a robotic agent, on behalf of and authorized by the user, to identify alternate options matching delivery capabilities with user availability and location;

notifying the user about any changes to the delivery, based on user preferences and providing one or more recommendations for driver delivery routes that take into consideration new times and locations for rescheduled deliveries, thus providing a seamless and automated solution for delivery rescheduling, reducing manual intervention, and improving overall efficiency.

8. The computer program product of claim 7, further comprising:

updating IoT and event-based settings and preferences, by the user, to trigger a reschedule event when a type of delivery includes specific items from a group consisting of medical supplies, perishable food, and items sensitive to outside temperatures.

9. The computer program product of claim 7, wherein user IoT sensor data and real-time events are integrated into the delivery schedule for each type of delivery category, further comprising:

re-routing the user to arrive home for a time-sensitive delivery, based on a user's schedule, projected location, and expected traffic correlated with a delivery time.

10. The computer program product of claim 7, wherein an authorized robotic agent acts on behalf of the user based on the IoT sensor data correlated with user preferences.

11. The computer program product of claim 10, wherein the user preferences comprise:

re-routing a delivery to an alternate location and time slot on a delivery route;

rescheduling the delivery for a future date, and canceling the delivery if rescheduling fees exceed a threshold amount.

12. The computer program product of claim 10, wherein the authorized robotic agent notifies the user to confirm a rescheduling or cancellation action for the delivery.

13. A computer system, comprising one or more computer devices each having one or more processors and one or more tangible storage devices; and a program embodied on at least one of the one or more storage devices, the program having a plurality of program instructions for execution by the one or more processors, the program instructions comprising instructions for:

detecting one or more events leading to a delay in a delivery schedule based on integrating internet of things (IoT) sensor data and real-time events, wherein one or more IoT sensors are located along a delivery route;

triggering, automatically, a reschedule event based on the detected one or more events leading to the delay in the delivery schedule;

determining availability and location of a user to receive a delivery, based on the reschedule event and a calendar of the user, and wherein a projected location of the user to receive the delivery is determined via a global positioning system (GPS);

autonomously increasing collection of additional IoT sensor data, based on temporal conditions, to detect and identify a risk in the delivery schedule powered by robotic-linked automation for various neighborhood conditions, wherein the increased IoT sensor data comprises weather events, traffic events, or road closures leading to a delayed delivery;

rescheduling or canceling the delivery based on the determined availability and location of the user, wherein the delivery is auto-adjusted by a robotic agent, on behalf of and authorized by the user, to identify alternate options matching delivery capabilities with user availability and location;

notifying the user about any changes to the delivery, based on user preferences and providing one or more recommendations for driver delivery routes that take into consideration new times and locations for rescheduled deliveries, thus providing a seamless and automated solution for delivery rescheduling, reducing manual intervention, and improving overall efficiency.

14. The computer system of claim 13, further comprising:

updating IoT and event-based settings and preferences, by the user, to trigger a reschedule event when a type of delivery includes specific items from a group consisting of medical supplies, perishable food, and items sensitive to outside temperatures.

15. The computer system of claim 13, wherein user IoT sensor data and real-time events are integrated into the delivery schedule for each type of delivery category, further comprising:

re-routing the user to arrive home for a time-sensitive delivery, based on a user's schedule, projected location, and expected traffic correlated with a delivery time.

16. The computer system of claim 13, wherein an authorized robotic agent acts on behalf of the user based on the IoT sensor data correlated with user preferences.

17. The computer system of claim 16, wherein the user preferences comprise:

re-routing a delivery to an alternate location and time slot on a delivery route;

rescheduling the delivery for a future date, and canceling the delivery if rescheduling fees exceed a threshold amount.

18. The computer system of claim 16, wherein the authorized robotic agent notifies the user to confirm a rescheduling or cancellation action for the delivery.

* * * * *